Oct. 7, 1924.
R. MEWES
1,510,793
APPARATUS FOR LIQUEFYING AND SEPARATING GAS MIXTURES
Filed March 30, 1921
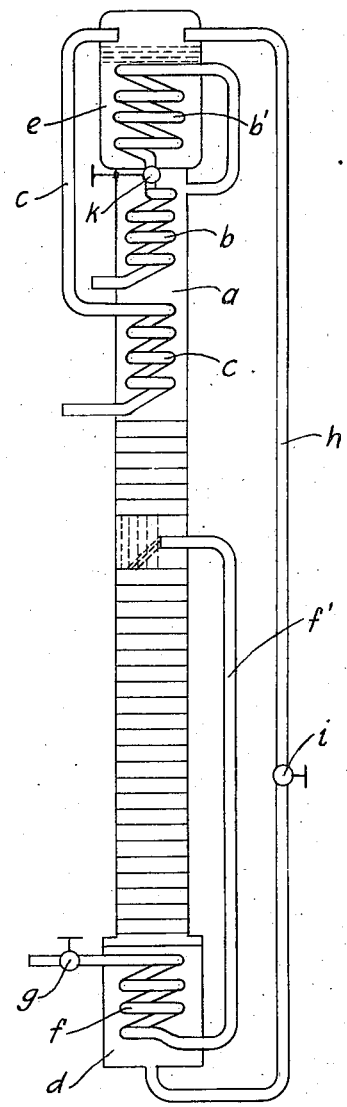
Rudolf Mewes
INVENTOR
BY Wm. Wallace White
ATTORNEY Patented Oct. 7, 1924.

1,510,793

UNITED STATES PATENT OFFICE.

RUDOLF MEWES, OF BERLIN, GERMANY.

APPARATUS FOR LIQUEFYING AND SEPARATING GAS MIXTURES.

Application filed March 30, 1921. Serial No. 457,000½.

*To all whom it may concern:*

Be it known that I, RUDOLF MEWES, a citizen of Germany, residing at Berlin, Germany, have invented certain new and useful Improvements in Apparatus for Liquefying and Separating Gas Mixtures (for which I have obtained Letters Patent in Germany, No. 317,889, on an application filed April 28, 1914), of which the following is a specification.

This invention relates to an improved apparatus for liquefying and separating gas mixtures, the object of the invention being to provide an apparatus by means of which the separation of the gases is accomplished by rectification or fractional distillation at a temperature considerably higher and at correspondingly higher pressure and smaller volume than was heretofore deemed possible.

A further object of the invention is to provide an apparatus by means of which the complete separation of the gases can be accomplished in a single operation, and which apparatus is extremely economical in operation.

A further object of the invention is to provide an apparatus by means of which a cooling element is conducted downwardly through the gases to be separated, the cooling element being maintained out of direct contact with said gases, the present invention being an improvement in part upon that described and claimed in Letters Patent of the United States No. 1,888,191, issued to me June 20, 1916.

The known processes for rectifying gas mixtures such as air, water-gas or the like are based on the assumption that a temperature which is at least as low as $-191°$ Celsius is required at the coldest part of the oxygen separating apparatus so that the drop of temperature available for the process of rectification amounts to the difference between $-182°$ and $-191°$ Celsius, or $-182°$ and $-193°$, or, when carried on in a vacuum, which is in the most favorable condition, between $-182°$ and $-196°$. In other words, the drop of temperature varies between a minimum of $9°$ and a maximum of $14°$. According to the prior state of the science and technics of gas distillation it did not appear possible to exceed these limits in the practice of extracting oxygen and nitrogen from the air.

But in rectifying at these temperatures, no matter whether it is a question of rectification in a narrower sense or of a multi-stage rectification process or dephlegmation, the appreciable disadvantage has to be coped with that the volumes to be dealt with would be very large at the pressure of the atmosphere and at slightly lower pressures, and hence the losses of cold by thermal leakage through the walls of the separating vessel would also be relatively large amounting to as much as 20 to 25%.

Besides, the apparatus required is very large and expensive; a fact which renders the process of separation uneconomical, particularly in the cases of plants for small outputs.

A circumstance that is very unfavorable for the thermo-dynamic efficiency of the said process is that it is necessary to employ temperatures as low and lower than $-191°$, this, as is well known, being a great drawback in constant working, because it involves great leakage through the metallic walls.

For the purpose of describing the principal features of the invention it will be assumed that oxygen and nitrogen are to be extracted from atmospheric air and that the lowest temperature in the interior of the separating or distilling column shall not go below $-170°$ Celsius. This temperature corresponds to a pressure of the nitrogen vapor in the column amounting to about 15 atmospheres, instead of 5 atmospheres as in the old process. The boiling point of oxygen at a pressure of 15 atmospheres lies at about $-140°$ Celsius. In this way a useful or effective drop of temperature of about $170-140=30°$ Celsius is obtained. But the effect is enhanced by the nitrogen, which boils at a temperature of $-170°$ under a pressure of 15 atmospheres, being allowed to expand in a cooling coil until its pressure drops to 1 atmosphere. This results in the boiling point of the nitrogen sinking to $-196°$, so that the total drop of temperature amounts to 196—140=56°. With the old process as herein before stated, the greatest drop of temperature obtainable in the column in spite of the increase of pressure would be approximately 15° Celsius, because not pure oxygen, but a mixture of 50 per cent of oxygen and nitrogen, whose boiling is —155° is obtained.

An additional factor is that by the above-mentioned increase of temperature from —191° to —170° a technical effect is obtained which, according to scientific measurements made by Bailey, results in the nitrogen vapor taking up much less oxygen per unit of weight when saturated than at the lower temperatures and pressures of the old process.

With the invention it is possible to decrease the saturability by oxygen of the nitrogen vapor under pressure at will by partly cooling down the nitrogen vapor to a temperature considerably under its boiling point, this being done by cooling elements past which the vapor flows and which are located at some distance from the point in the column where the said vapor is conducted out. By this means the last traces of oxygen in the vapor are condensed and separated from the nitrogen. In other words, the process for low temperatures and pressures described in the German Patent 227,100 is adapted to higher pressures and temperatures and used in the present invention for removing the last traces of oxygen from nitrogen vapor, or for sifting it out as it were and conducting it away further back in the separating device.

An important feature in the present invention is that the medium in the column is not cooled by mixing the cold nitrogen with this medium but by contact with the surface of a conduit through which the cold nitrogen is conducted, this conduit taking the form of an evaporating coil or coils. Further features are the utilization of the cold of the liquid oxygen, the shifting of the interval between a higher and a lower temperature to a different part of the temperature scale and in reducing at the same time the proportion of oxygen in the nitrogen vapor and in decreasing the gas volume whilst maintaining the weight per unit of space or making it larger than it could be made hitherto.

The scientific foundation underlying the present invention consists in the fact discovered by me that no matter what pressure is applied to gaseous nitrogen it will never absorb more than the same definite amount of saturated oxygen at the same temperature. From analogies regarding the saturation of air with steam at different pressures and from the law of partial volumes I have found that the same laws hold for mixtures of nitrogen and oxygen vapor as for steam.

An important advantage of the present invention consists in the fact that it is not necessary to liquefy the whole of the air to be distilled but only a certain fraction of the same so that the oxygen can, as it were, be sifted or washed out at a higher pressure than that of the atmosphere. The condensed liquid and the cooling vapors, contrary to modes of operation employed hitherto, flow in one and the same direction, the stream of cooling vapors being subdivided or made to flow through a plurality of passages or pipes. The unidirectional flow of the condensed liquid and the cooling vapors is due to the fact that the vapor which condenses in the top of the distilling chamber or in any part of this chamber liquefies by contact with the cooling elements chilled by the expanded cold vapors and then flows down on the exterior surfaces of these elements in the same direction as the cooling vapors in them on account of its greater specific gravity.

In accordance with the present invention the cooling operation is due to conduction, or the transmission of cold through the cooling walls of the cooling elements. Besides, only one pressure stage is used in the distilling column. The liquid nitrogen formed in the cooling pipe is not conducted into the interior of the column but through a pipe or passage passing through the column. By this arrangement the cold of evaporation only is made available in the interior chamber of the column but the refrigerant itself is not introduced into the said chamber but immediately conducted away in a vaporous state. By this means the important technical advantage is obtained that the oxygen and the nitrogen can be separated from each other in one operation by the regenerative process under any pressure in the separating chamber, no matter what kind of process is employed for the actual separation of the gases. The pressure may be increased up to the critical pressure of nitrogen or oxygen without detriment to the process. The process may be carried out with low pressures.

A separating or distilling column for carrying out the process is diagrammatically illustrated in the drawing. The condensed liquid and the cooling vapors both travel downward from the top part of the column, the cooling vapors being conducted downward by the coils $b$ and $c$ while the condensed liquid in the interior of the column trickles down on the surfaces of the coils $b$ and $c$. The coils $b$ and $c$ may each be subdivided into a number of collateral branch pipes. It is obvious that the condensed liquid that is formed on the surfaces of the cooling elements or pipes $b$ and $c$ of the column, or in fact in any part of the distilling column, flows downward on account of its higher specific gravity, i. e. it travels in the same direction as the refrigerant vapors in the cooling pipes *b* and *c*. The separation of the oxygen and nitrogen is accomplished in the distilling column in one operation in the following manner:

The liquid nitrogen formed in the cooling coil *b'* is not introduced into the interior of the column but, after having passed down through the valve *k*, is allowed to expand in a special cooling pipe *b* which passes through the column. By this arrangement the cold of evaporation only of the expanded nitrogen is made available in the interior of the chamber *a*, but the refrigerant itself or the carrier of the said cold is not introduced into the chamber but is immediately conducted away in a vaporous state. By this means the advantage is obtained that the oxygen and nitrogen may be completely separated by the regenerative process in a single operation at any pressure in the separating chamber, no matter what particular process is used for the actual separating operation. The pressure may be raised up to the critical pressure of the oxygen or the nitrogen without detriment to the process.

The liquid oxygen is conducted away from the bottom *d* of the column *a* through the pipe *h* and the valve *i* to the oxygen evaporator or cooling chamber *e*, from whence it flows in a vaporous state through the pipe *c*, which merges into a cooling coil in the upper part of the column as shown.

The liquid air formed in the liquefying coil *f* is conducted through the pipe *f'* into the interior of the column *a*, while the cold of the gases conducted away through prolongations of the pipes *b* and *c* may be turned to account in a known manner in a heat exchanger (not shown).

In the column *a* whose interior space is under pressure, pure liquid oxygen is obtained at the bottom *d* and in its upper part pure nitrogen is produced, the heat of whose vapor is carried off by pipe *b'* and thus made available for use in a counter current heat exchanger after it has left the separating column.

The novel method of operation permits of any air liquefying process being used in conjunction with the separating column. This can be done by inserting an expansion valve *g* (throttle device) or an expansion machine in the inflow conduit carrying fresh compressed air into the bottom liquefying coil and thus producing by expansion of the compressed air until its pressure sinks to that existing in the liquefying coil, the cold necessary to make up for the losses due to radiation etc., and for the continuous operation of the plant. The cold vapors or gases passing out of the separator *a* deliver up their cold in the counter current heat exchanger to the fresh compressed medium in the well known manner.

To enhance the thermo-dynamic efficiency of the process in cases in which an expansion machine is employed, the vaporous nitrogen may be reheated in any suitable manner.

I claim:

1. An apparatus of the class described, comprising, in combination, a rectifying column, means for introducing compressed gas into said column, a cooling chamber disposed above said column, a gas conduit in communication with the upper end of said column and passing through said chamber, a tension relieving device in communication with said conduit, and a cooling conduit in the upper end of the column, said cooling conduit communicating at one end with said tension-relieving device and having its delivery end outside of said column.

2. An apparatus of the class described, comprising, in combination, a rectifying column, means for introducing compressed gas into said column, a cooling chamber disposed above said column, a gas conduit in communication with the upper end of said column and merging into a coil within said chamber, a tension-relieving device in communication with said coil, and a cooling coil in the upper end of the column, said cooling coil forming a passage communicating at one end with said tension-relieving device and having its delivery end outside of said column.

3. An apparatus of the class described, comprising, in combination, a rectifying column, means for introducing compressed gas into said column, a cooling chamber above said column, a gas conduit in communication with the upper end of said column and merging into a coil within said chamber, a tension-relieving device in communication with said coil, a primary cooling coil in the upper end of the column forming a passage communicating at one end with said tension-relieving device and having its delivery end outside of said column, and a secondary cooling coil in the upper part of the column, said secondary coil communicating at one end with the upper part of said cooling chamber and having its delivery end outside of said column.

4. An apparatus of the class described, comprising, in combination, a rectifying column, means for introducing compressed gas into said column, a cooling chamber above said column, a gas conduit in communication with the upper end of said column and merging into a coil within said chamber, a tension-relieving device in communication with said coil, a primary cooling coil in the upper end of the column and communicating at one end with said tension-relieving device and having its delivery end outside of said column, a secondary cooling coil in the upper part of the column and communicating at one end with the upper part of said cooling chamber and having its delivery end outside of said column, and a conduit communicating at one end with the lower end of the column and at the other end with the upper part of the cooling chamber.

In testimony whereof I have signed this specification in the presence of two witnesses.

RUDOLF MEWES.

Witnesses:
REITHE SEECK,
OTTO SCHNEIDER.